United States Patent
Nord et al.

(10) Patent No.: US 7,778,488 B2
(45) Date of Patent: Aug. 17, 2010

(54) IMAGE DEFORMATION USING MULTIPLE IMAGE REGIONS

(75) Inventors: Janne Nord, Espoo (FI); Jarkko Peltola, Tuusula (FI)

(73) Assignee: Varian Medical Systems International AG (CH)

(*) Notice: Subject to any disclaimer, the term of this patent is extended or adjusted under 35 U.S.C. 154(b) by 816 days.

(21) Appl. No.: 11/726,884

(22) Filed: Mar. 23, 2007

(65) Prior Publication Data

US 2008/0232714 A1    Sep. 25, 2008

(51) Int. Cl.
G06K 9/36    (2006.01)
(52) U.S. Cl. .................. 382/284; 382/128; 382/278; 382/294
(58) Field of Classification Search ............ 382/128, 382/131, 132, 260, 264, 282, 284, 294
See application file for complete search history.

(56) References Cited

U.S. PATENT DOCUMENTS

| | | | |
|---|---|---|---|
| 5,398,684 A * | 3/1995 | Hardy | 600/391 |
| 7,124,041 B1 * | 10/2006 | Johnson et al. | 702/58 |
| 7,184,814 B2 * | 2/2007 | Lang et al. | 600/416 |
| 7,239,908 B1 * | 7/2007 | Alexander et al. | 600/427 |

OTHER PUBLICATIONS

Wilkie, K. P. et al., "Mutual Information-Based Methods to Improve Local Region-of-Interest Image Registration" Image Analysis and Recognition Lecture Notes in Computer Science; LNCS, Springer, Berlin, DE, vol. 3656, Sep. 28, 2005, pp. 63-72, XP019020206, ISBN: 978-3-540-29069-8, abstract, section 3.1.

Stefanescu, R. et al., "Grid powered nonlinear image registration with locally adaptive regularization", Medical Image Analysis, Oxford University Press, GB, vol. 8, (2004), pp. 325-342.

Shen, Jian-Kun et al., "Deformable Image Registration", Image Processing, ICIP 2005, IEEE International Conference, Sep. 11-14, 2005, IEEE, vol. 3, pp. 1112-1115, ISBN 978-0-7803-9134-9/05.

Lester, H. et al., "Non-linear registration with the variable viscosity fluid algorithm", Proceedings of the 16th International Conference on Information Processing in Medical Imaging, Lecture Notes in Computer Science, Springer-Verlag, UK, vol. 1613, pp. 238-251, 1999, ISBN: 3-540-66167-0.

(Continued)

*Primary Examiner*—Yosef Kassa
(74) *Attorney, Agent, or Firm*—Gard & Kaslow LLP (57) ABSTRACT

Disclosed are systems for and methods of registering (i.e., aligning) a deformable image with a reference image subject to a plurality of regions within the deformable and reference images. Different members of the plurality of regions may be used in different phases of a deformation algorithm and the identity of these regions may change between different iterations of the deformation algorithm. In some embodiments, most of an image is used for calculation of the internal force of the demons algorithm while a smaller subset of the image is used for calculating the opposing external force.

27 Claims, 5 Drawing Sheets

OTHER PUBLICATIONS

Wang, H. et al., "Validation of an accelerated 'demons' algorithm for deformable image registration in radiation therapy", Physics in Medicine and Biology, Taylor & Francis Ltd., London, GB, vol. 50, No. 12, Jun. 2005, pp. 2887-2905.

Thirion, Jean-Philippe, "Non-Rigid Matching Using Demons", Proceedings of the 1996 Conference on Computer Vision and Pattern Recognition (CVPR '96), San Francisco, Jun. 18-20, 1996, IEEE Computer Society, Washington, DC, USA, pp. 245-251, ISBN: 0-8186-7258-3.

* cited by examiner

```
┌─────────────────────────────────────────────────┐
│                                                 │
│      Internal Force Computation Engine 220      │
│                                                 │
│                                                 │
│              ┌───────────────────┐              │
│              │ In-place Flexibility│            │
│              │ Computation Engine │             │
│              │        310         │             │
│              └───────────────────┘              │
│                                                 │
│                                                 │
│              ┌───────────────────┐              │
│              │    Accumulator    │              │
│              │ Computation Engine│              │
│              │        320        │              │
│              └───────────────────┘              │
│                                                 │
└─────────────────────────────────────────────────┘
```

IMAGE DEFORMATION USING MULTIPLE IMAGE REGIONS

BACKGROUND

1. Field of the Invention

The present invention relates generally to the field of image registration and more specifically to the field of image registration configured for medical applications.

2. Related Art

Deformable image registration is a technique for modifying a deformable image in an elastic way to match similar features in a reference image. The technique, in general, involves determining a transform necessary to register (e.g., to align) two images by matching structures of interest in the deformable image and the reference image and to deform the deformable image to achieve alignment of these structures. The deformable and reference images may be images of a patient at different times. The deformable image may be an image of a healthy person and the reference image may be an image of a patient, or vice versa.

For example, the deformable image may include an image of a patient in which a physician has carefully delineated a treatment volume, and the reference image may include an image of the same patient recorded at a later time during treatment. A treatment volume is a spatial volume within a patient to be treated using radiation such as X-rays or particle beams. By deforming the carefully delineated image to align with an image recorded during treatment, movement in the treatment volume can be readily identified. The unaltered reference image, having a treatment volume identified through the image registration process, can then be used to target the new position of the treatment volume during treatment.

The technique has various medical applications. One medical application includes identification of movement or change in organs in medical images acquired at different points in time, for example, changes in patient anatomy since an image was taken at the outset of a treatment plan. Movement or changes in organs can occur due to the spread of cancer, bladder fullness, swelling, breathing, etc.

Another medical application of the deformable image registration technique is segmentation of images using a pre-segmented atlas against which the images are registered. After registration is complete, an identity and/or scope of an anatomical structure within the reference image can be established automatically using previous identification of a corresponding structure within the deformable image. Both medical applications allow for the identification of, for example, changes in an organ during the course of treatment such that the treatment may be altered or discontinued.

Typically, the deformable image registration technique involves determination of a mapping between the two images. This mapping may be bi-directional, e.g., it may be used to map from one image to the other in either direction. As such, the labeling of the two images as the "deformable" image and the "reference" image is typically a convention used for convenience.

The mapping between the two images can be represented by a deformation field (e.g., transformation). For example, the deformation field may be represented by a set of transform vectors representative of the dislocation of pixels between images. Determination of the deformation field includes use of a deformation algorithm that is iteratively applied in two phases. A first phase includes execution of an image based similarity force that alters the deformation field such that the image intensities within the two images match more closely on a pixel by pixel basis. In another phase, a flexibility model is applied to the deformation field. This flexibility model may include determining an internal force field, represented by a set of vectors, that are opposed to the image similarity force.

Various deformation algorithms exist in the prior art, for example, the demons algorithm. The flexibility model in the demons algorithm comprises Gaussian smoothing of the field of displacement vectors. A "similarity" force, opposed to the effect of smoothing displacement vectors, is then applied by using a normalized optical flow. One advantage of the demons algorithm is the speed at which the steps of the algorithm are performed (e.g., on the order of minutes).

A disadvantage of existing deformation algorithms is that all regions of an image are treated equally in each phase. As such, in the registration of an image including both a first organ and a second organ of relatively great interest, those parts of the image including each organ are equally weighted. This may be a disadvantage if the primary purpose of the registration process is to match the second organ.

There is, therefore, a need for improved systems and methods of registering medical images.

SUMMARY

Various embodiments include systems for and methods of registering (i.e., aligning) a deformable image with a reference image subject to a plurality of different regions within the reference and/or deformable images. These different regions may be separate or overlapping. For example, a first region may include most of an image while a second region may include a subset of the first region. The first region may be emphasized during an initial course localization and the second region may be more heavily weighted in a subsequent more accurate refinement according to a registration algorithm. This weighting may change progressively over time. The identity of the second region may change during the registration process.

In some embodiments, different parts of a registration algorithm are executed using different regions as input. For example, as discussed further herein, the demons algorithm includes phases in which external and internal forces are alternatively applied. These forces may be calculated using different regions within the images as input, e.g., the internal force may be calculated using image date from the second region while the external force is calculated using image data from the first region. When a registration algorithm is executed using a particular region as input, the results of this execution may be applied to just the particular region, to another region or to the entire image. Use of a region, as discussed herein, includes using image data from the region as input to all or part of a registration algorithm. Image data may include pixel intensity, flexibility, forces, quality of match, a priori properties, accumulators, displacement vectors, other features of an image, and/or the like.

Various embodiments include extensions to the demons algorithm of the prior art, although the systems and methods described herein may be applied to other image registration algorithms. The demons algorithm comprises two phases of determining an image transformation. In one phase, the image transformation is determined using a path of least resistance under the influence of an external force. This force is considered external because a transform vector associated with each pixel is determined by considering intensities of pixels in the reference image so as to minimize the differences in intensities between the deformable image and the reference image. In another phase, the demons algorithm reconnects the pixels using a smoothing model applied to the image transformation. This internal force tends to keep the pixels together to prevent the entire deformable image from being dissolved by the image transformation. The internal force tends to apply a force to the pixels opposing the external force of the first phase. In order to determine the image transformation that will deform the deformable image to match the reference image, these two phases of the demons algorithm are typically repeated in an iterative process. Various embodiments further include a repository for storing images and/or other data associated with a deformation engine, a computing system for storing part or all of the data associated with the deformation algorithm, and an image generation apparatus for printing or displaying, for example, a deformed image.

Various embodiments of the invention include an image registration system comprising a deformation engine including first logic configured to compute a flexibility model using a first region within a medical deformable image and to apply the computed flexibility model to the medical deformable image to generate a set of displacement vectors, the set of displacement vectors being configured to apply a first force to the medical deformable image, second logic configured to compute a smoothing function using the first region within the medical deformable image and to apply the smoothing function to the set of displacement vectors to create a smoothed set of displacement vectors, third logic configured to compute a transform using a second region of the medical deformable image, the transform being configured to apply a second force to the medical deformable image, the second force opposing the first force, and fourth logic configured to apply the smoothed set of displacement vectors and the transform to the medical deformable image in one of a plurality of iterations to deform the medical deformable image to match a reference image.

Various embodiments of the invention include an image registration system comprising a deformation engine including first logic configured to compute a flexibility model using a medical deformable image, and to apply the computed flexibility model to the medical deformable image to generate sets of displacement vectors, the sets of displacement vectors being configured to apply a first force to the medical deformable image, second logic configured to compute smoothing functions using a first region of the medical deformable image and to apply the computed smoothing function to the sets of displacement vectors to create a smoothed set of displacement vectors, third logic configured to compute transforms using a first region and a second region of the medical deformable image, the transform being configured to apply a second force to the medical deformable image, the second force opposing the first force, and fourth logic configured to apply the smoothed sets of displacement vectors and the transforms to the medical deformable image in an iterative process to deform the medical deformable image to match a reference image, at least one iteration of the iterative process including use of the first region to compute one of the smoothing functions and use of the second region to compute one of the transforms.

Various embodiments of the invention include a method comprising computing a set of displacement vectors according to a flexibility model using a first region of a medical deformable image, the set of displacement vectors being configured to apply a first force to the medical deformable image, applying a smoothing function to the set of displacement vectors to create a smoothed set of displacement vectors, computing a transform using a second region of the medical deformable image, the transform being configured to apply a second force to the medical deformable image, the second force opposing the first force and being different from the first region, and applying the transform and the smoothed set of displacement vectors to the medical deformable image in an iteration of a deformation algorithm configured to match the medical deformable image to a reference image.

Various embodiments of the invention include an image deformation engine comprising first logic configured to compute a plurality of weights associated with a first region within a medical deformable image, and to use the plurality of weights to determine a first set of force vectors, the first set of force vectors being configured to apply a first force to an image transformation between the medical deformable image and a reference image, second logic configured to compute a flexibility model using a second region within the medical deformable image and to apply the flexibility model to generate a second set of force vectors, the second set of force vector being configured to apply a second force to the image transformation, the second force opposing the first force, and third logic configured to apply the first set of force vectors and the second sets of force vectors to the image transformation in one of a plurality of iterations to match the medical deformable image and the reference image.

Various embodiments of the invention include an image deformation engine comprising first logic configured to compute a plurality of weights associated with a first region within a medical deformable image and to use the plurality of weights to determine a first set of force vectors, the first set of force vectors being configured to apply a force to an image transformation between the medical deformable image and a reference image, second logic configured to compute a flexibility model using a second region within the medical deformable image and to apply the flexibility model to the image transformation, and third logic configured to use the first logic and the second logic in one of a plurality of iterations to generate the image transformation.

DETAILED DESCRIPTION

Various embodiments of the invention include systems for and methods of registering (i.e., aligning) a deformable image with a reference image using a plurality of different regions within the reference image. The registration is accomplished using a registration system and includes determining an image transformation configured to modify the deformable image (e.g., an image of a healthy individual used as a template) to match similar features in the reference image (e.g., an image of a patient). The registration system includes a deformation engine configured for performing a deformation algorithm. In some embodiments, this deformation algorithm is configured to use different regions of the reference and/or deformable images in different phases of the deformation algorithm. In some embodiments, this deformation algorithm is configured to use a time dependent weighting factor to control the weight given to two different regions within an image. This time dependent weighting factor may be used in one or more than one phases of the deformation algorithm.

Typically, one phase of the deformation algorithm includes the use of an external force calculation model configured to change displacement (transform) vectors between parts of a reference image and parts of a deformable image. A smoothing model is typically applied to these calculated displacement vectors. As is further described herein, calculation of an image transformation using the deformation algorithm may be performed in multiple iterations. In some embodiments, the regions (e.g., parts) of the images on which the external force calculation model, internal force calculation model and/or flexibility values calculation model operates changes between iterations. In some embodiments, the weighting between regions considered by the deformation algorithm changes between iterations. In some embodiments, both the identity and weighting of regions changes between iterations. The flexibility model may include varying degrees of complexity ranging form a set of constant flexibility values to a bi-directional multi-dimensional flexibility model dependent on location as well as direction of internal and external forces exerted on individual pixels.

A deformable image may be referred to as a medical deformable image herein when the deformable image is used for medical and/or anatomical purposes.

The deformation algorithm is performed by a deformation engine that includes an external force computation engine, an internal force computation engine, a matching engine, and a region determination engine. In some embodiments, the internal force computation engine includes logic configured to compute and apply a smoothing model. The smoothing model can be the Gaussian model used in the demons algorithm or another smoothing model, for example, an exponential smoothing model. The external force computation engine is configured to calculate and apply an external "force" between regions, sets of pixels, and/or individual pixels of the deformable image. This external force is sometimes referred to as a matching force and is opposed to the internal force.

The image registration system optionally further includes a repository configured for storing data associated with the deformation algorithm (e.g., data used as inputs and/or generated as interim and/or final results). For example, in some embodiments, sets of flexibility values, a priori properties of organs and/or patients, the reference and deformable images, predetermined regions of the images, or the like, are stored in the repository. Alternative embodiments include a computing system, external to the deformation engine, configured for storing part or all of the data associated with the deformation algorithm.

In some embodiments, the image registration system optionally further includes an image generation apparatus for producing the deformable image. The image generation apparatus may include, for example, an X-ray source and corresponding detector, a computed tomography system, a magnetic resonance system, an ultrasound system, and/or the like.

Figure 1:
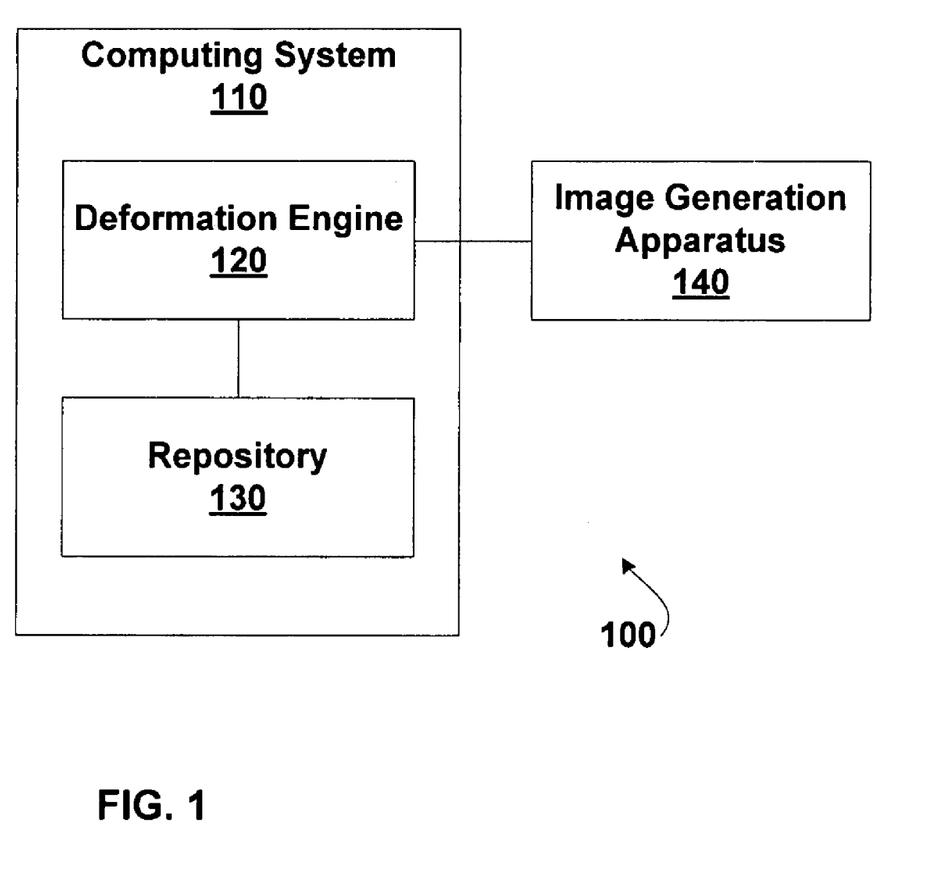
FIG. 1 illustrates various embodiments of an image registration system.

FIG. 1 illustrates an Image Registration System, generally designated 100, according to various embodiments of the invention. Image Registration System 100 is configured to deform a deformable image into alignment with a reference image. This deformation is represented by an image transformation determined using the deformation algorithm as applied to more than one different region within the images. Image Registration System 100 is optionally further configured to perform computations responsive to the deformed deformable image. For example, some embodiments of Image Registration System 100 include logic configured to compute a volume and/or location of an anatomical structure in the deformable image, such as the volume of gray brain matter or a tumor. In various embodiments, the logic comprises a processor, other computer readable medium and/or other hardware in which firmware and/or software is embodied.

Image Registration System 100 typically includes a Computing System 110. Computing System 110 may comprise, for example, a personal computer, workstation, server, computing devices distributed over a network, and/or the like. Computing System 110 comprises logic configured for performing computations and/or data processing associated with the deformation algorithm. This logic includes a Deformation Engine 120 discussed further elsewhere herein. In some embodiments, Computing System 110 further comprises a Repository 130 configured to store computing instructions, a reference image, a deformable image, and/or data (e.g., regions, weights, values and/or parameters) associated therewith. Repository 130 may include static memory, magnetic memory, random access memory, non-volatile memory, volatile memory, magnetic storage, optical storage, and/or the like. In one embodiment, Repository 130 includes dynamic read only memory and a hard disk. For example, in some embodiments, Computing System 110 comprises a hard drive configured to store data associated with the patient, the reference image, the anatomical structure (e.g., organ) of interest, the deformable image (e.g., a segmented brain atlas), an image transformation, predetermined regions of interest, initial values associated with the deformation algorithm, and/or the like.

Deformation Engine 120 is configured for deforming the deformable image, e.g., determining an image transformation, according to a deformation algorithm. Deformation Engine 120 comprises logic configured for performing computations and/or data processing associated with the deforming of the deformable image. This logic may include hardware, firmware and/or computing instructions disposed on a computer readable medium. In some embodiments, Deformation Engine 120 includes a microprocessor and associated memory. As is discussed further herein, the deformation algorithm may comprise the demons algorithm, an exponential smoothing algorithm, and/or the like.

In some embodiments, part of Deformation Engine 120 is disposed external to Computing System 110. Likewise, in some embodiments, part of Repository 130 is disposed external to Computing System 110.

Image Registration System 100 further optionally includes an Image Generation Apparatus 140 configured for generating the reference image and/or the deformable image. For example, Image Generation Apparatus 140 may include a radiation (e.g., X-ray or particle beam) source and associated detector configured to detect X-rays passed through a patient. In various embodiments, Image Generation Apparatus 140 includes a magnetic resonance imaging device, a computed tomography device, an ultrasound device, an X-ray device, and/or other device known in the art to generate internal images of a patient. Image Generation Apparatus 140 may be configured to generate two-dimensional, three-dimensional, or four-dimensional images. In some embodiments, Image Generation Apparatus 140 is configured to generate a series of images, for example, a three-dimensional time series of breathing motion. This series is an example of a four-dimensional image. Image Generation Apparatus 140 is optionally configured to communicate image data to Computing System 110 through a direct connection (e.g., a cable), over a computing network, or through an alternative communication network.

In various embodiments, Image Generation Apparatus 140 is coupled to Deformation Engine 120. In some embodiments, Image Generation Apparatus 140 is coupled to Computing System 110. In yet other embodiments, part or all of Image Generation Apparatus 140 is included in Computing System 110.

Figure 2:
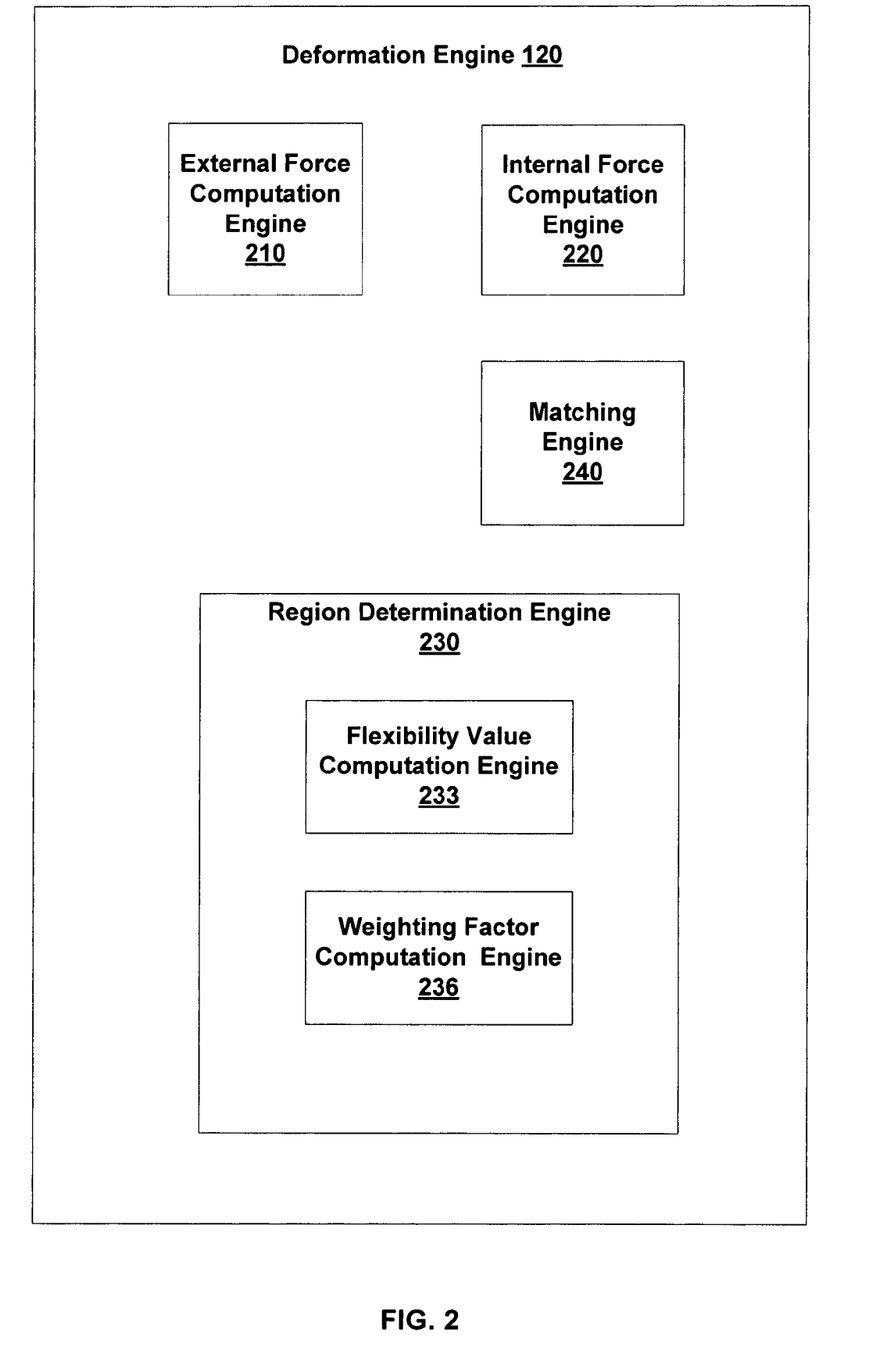
FIG. 2 illustrates various embodiments of a deformation engine.

FIG. 2 illustrates various embodiments of Deformation Engine 120. Deformation Engine 120 comprises an External Force Computation Engine 210, an optional Internal Force Computation Engine 220, a Region Determination Engine 230, and a Matching Engine 240. Each of these elements may be embodied in hardware, firmware or computing instructions within Computing System 110.

External Force Computation Engine 210 is configured for computing an external transform to the image transformation. This computation is responsive to the deformable and reference images. External Force Computation Engine 210 comprises logic configured for performing computations and/or data processing associated with the computation of the external transform. For example, in some embodiments, External Force Computation Engine 210 includes computing instructions embodied on a computer readable medium and configured to be executed using a processor of Computing System 110.

The external transform computed using the External Force Computation Engine 210 is configured to apply an external "force" between regions, sets of pixels, and/or individual pixels of the deformable image. This force is sometimes referred to as a matching force, and tends to cause spatial compression and/or stretching between neighboring pixels, e.g., to increase or decrease the magnitude of transform vectors within the image transformation. This force is opposed to the internal force vectors. In various embodiments, the external transform comprises a set of scalars, for example a multiplier, representative of the external force. In various embodiments, the external transform comprises a set of multi-dimensional vectors, each representing an external force on a pixel, set of pixels, or region to be applied to the deformable image. In various embodiments, the external transform is based, in part, on the demons algorithm by Thirion and/or an extension to the demons algorithm, such as but not limited to the extensions described in U.S. application Ser. No. 11/542,958 entitled "Use of Quality of Match to Estimate Cone Beam CT Reconstruction Artifact Correction Weight in Image Registration." Further details of the demons algorithm can be found in "Image matching as a diffusion process: an analogy with Maxwell's demons," by J.-P. Thirion, *Medical Image Analysis*, vol. 2, no. 3, pp. 243-260, 1998. Alternatively, the external transform may be based on other deformation algorithms.

In various embodiments, the External Force Computation Engine 210 is configured to operate on one or more regions of the deformable and reference images. The identity and/or weighting of these regions are determined by the Region Determination Engine 230 as is further described elsewhere herein. In some embodiments, the identity and/or weighting of the regions changes with time. For example, at the start of the image deformation the region considered by the External Force Computation Engine 210 may include all of each of the deformable image and reference image. As the image deformation progresses through successive iterations, the region considered by the External Force Computation Engine 210 may be a smaller region of the images. Typically, the region considered by the External Force Computation Engine 210 as the successive iterations near a final result of the deformation process includes primarily a region of greatest interest, e.g., a region configured to include an area around a treatment volume.

In other embodiments, External Force Computation Engine 210 is configured to operate on two regions whose relative contribution to the calculations of the External Force Computation Engine 210 is determined by a weighting factor. This weighting factor may change with time. For example, a first region may include most or all of the images and a second region may include an area of greatest interest. At the beginning of an image deformation process, the first region is more highly weighted, while near the end of the image deformation process, the second region is more highly weighted. Further details of these embodiments are discussed elsewhere herein.

Internal Force Computation Engine 220 is configured for computing the internal force that tends to reduce excessive spatial compression and/or stretching between neighboring pixels of the deformable image. Such excessive compression and/or stretching might otherwise cause a region of the deformable image to dissolve. Internal Force Computation Engine 220 is configured for computing one or more displacement vectors, one or more accumulators, and/or a smoothing function. Internal Force Computation Engine 220 comprises logic configured for computing one or more internal force vectors, one or more accumulators, and/or a smoothing function. For example, in one embodiment, Internal Force Computation Engine 220 includes a processor and associated computing instructions configured to determine a displacement vector associated with each pixel of a deformable image. The displacement vector is all or part of a transform vector representative of a displacement of a pixel relative to an original position of the pixel. For example, the displacement vector may be used as a starting value for a transform vector or may be applied to a preexisting transform vector in order to change the preexisting transform vector. The displacement of one or more pixels results in deformation of the deformable image.

Internal Force Computation Engine 220 is further configured to determine displacement vectors responsive to flexibility models. This flexibility model is used to determine the flexibility of the displacement of pixels, sets of pixels, and/or regions of an image. For example, a pixel associated with a larger flexibility value may be associated with a displacement vector of greater magnitude relative to a pixel associated with a smaller flexibility value. In various embodiments, the flexibility model is based, in part, on the demons algorithm by Thirion et al., and/or an extension thereto. The flexibility model is described in further detail elsewhere herein, e.g., in connection with FIG. 5.

Internal Force Computation Engine 220 is further configured for smoothing (e.g., filtering) the deformable image by applying a smoothing model that uses the computed displacement or transform vectors. In various embodiments, Internal Force Computation Engine 220 is configured to use different smoothing models. For example, in some embodiments, Internal Force Computation Engine 220 is configured to use a smoothing model based on a Gaussian function. This Gaussian function is optionally similar to that used in the demons algorithm and/or an extension thereto. This Gaussian function is optionally variable during deformation of an image. For example, the standard deviation of the Gaussian function may be constant or may be changed between successive iterations of the deformation algorithm.

In some embodiments, Internal Force Computation Engine 220 is further configured to use a smoothing model based on an exponential function. The exponential function is optionally spatially variant, i.e., it can vary as a function of position and/or direction. These embodiments are further described in U.S. application Ser. No. 11/542,958 entitled "Use of Quality of Match to Estimate Cone Beam CT Reconstruction Artifact Correction Weight in Image Registration."

In various embodiments, the Internal Force Computation Engine 220 is configured to operate on regions of the deformable and reference images. In these embodiments, the identity and/or weighting of these regions is determined by the Region Determination Engine 230 as is further described elsewhere herein. In some embodiments, the identity and/or weighting of the regions change with time. For example, at the start of the image deformation the region considered by the Internal Force Computation Engine 220 may include all of each of the deformable image and reference image. As the image deformation progresses through successive iterations, the region considered by the Internal Force Computation Engine 220 may be a smaller region. Typically, the region considered by the Internal Force Computation Engine 220 as the successive iterations near a final result of the deformation process includes primarily a region of greater interest, e.g., a region configured to include an area around a treatment volume.

In other embodiments, Internal Force Computation Engine 220 is configured to operate on two or more regions whose relative contribution to the calculations of the Internal Force Computation Engine 220 is determined by a weighting factor. This weighting factor may change with time. For example, a first region may include most or all of the images and a second region may include a small area of greater interest. At the beginning of an image deformation process, the first region is more highly weighted, while near the end of the image deformation process, the second region is more highly weighted. Further details of these embodiments are discussed elsewhere herein.

In some embodiments, both External Force Computation Engine 210 and Internal Force Computation Engine 220 are configured to use two or more regions to deform an image. In some embodiments, External Force Computation Engine 210 but not Internal Force Computation Engine 220 is configured to use two or more regions to deform an image. In some embodiments, Internal Force Computation Engine 220 but not External Force Computation Engine 210 is configured to use two or more regions to deform an image. Different regions, or sequences thereof, are optionally used by the External Force Computation Engine 210 and Internal Force Computation Engine 220.

Region Determination Engine 230 may include an optional Flexibility Value Computation Engine 233 and/or an optional Weighting Factor Computation Engine 236, and is configured for determining a region or weighting thereof to be operated on by External Force Computation Engine 210 and/or Internal Force Computation Engine 220. There are several approaches to this determination, which can be found in various embodiments of the invention. One approach includes the use of a sliding weighting factor to control the relative consideration given to each of two regions. This sliding weighting factor is calculated using Weighting Factor Computation Engine 236.

For example, a first transform may be calculated using a first of the two regions and a second transform calculated using a second of the two regions. These two regions may be two of a series of regions between an entire image and a final region of interest. Alternatively, they may be the entire image and the final region of interest. The two different transforms are then weighted according to a weighting factor w, calculated using Weighting Factor Computation Engine 236, that varies between zero and one. In one embodiment the weighting factor is used according to the formula: $T_w (1-w)T_a + wT_b$, where $T_w$ is the weighted transform to be applied to the deformable image, $T_a$ is the first transform calculated using the first region, and $T_b$ is the second transform calculated using the second region. In other embodiments, the weighting factor w is applied using a non-linear function. $T_w$, $T_a$ and $T_b$ are optionally matrices. The weighting factor may change during the image registration process. For example, w may change between iterations of the deformation algorithm. Different values of the weighting factor w or different functions for using the weighting factor w may be used by the External Force Computation Engine 210 and the Internal Force Computation Engine 220.

In another example, a single transform may be calculated directly using both the first and the second of two regions. The relative weighting given to each of the two regions in this calculation is dependent on the weighting factor w.

In various embodiments, the weighting factor w is changed from a value of zero to a value of one in incremental steps as the image deformation algorithm progresses. For example, in some embodiments, the weighting factor is incremented by a constant amount, e.g., by 0.01 over 100 iterations. In some embodiments, the weighting factor w is changed responsive to a quality of match between images. If the quality of match reaches a value determined prior to calculation of the weighting factor w, then the weighting factor is changed in response. In some embodiments, the weighting factor is changed in response to a change in quality of match as seen between iterations of the image deformation algorithm. For example, if improvements in the quality of match slows between successive iterations, the value of the weighting factor w may be increased.

For example, in some embodiments, the selection or weighting of regions is responsive to a quality of match determined between two images, or regions thereof. For example, if the quality of match reaches a threshold value, the next iteration of the deformation algorithm may be performed using a different region or weighting thereof. In yet other embodiments, the selection of regions is responsive to magnitudes of internal and external forces. For example, although internal and external forces are at equilibrium, both forces may be high or both forces may be low. When the magnitudes of forces are consistently found to be high in a specific region, a different region may be used in later iterations. In still other embodiments, a region is determined based on the detail available about, for example, an organ and/or a treatment volume.

Flexibility Value Computation Engine 233 is configured for computing the set of flexibility values associated with the flexibility model. The computed set of flexibility values is optionally computed using one of a plurality of alternative regions, e.g., either a first region, a second region, an intermediate region, and/or a weighted combination of the first region and second region. The region used by the Flexibility Value Computation Engine 233 may change between iterations of the deformation algorithm. Different regions may be associated with different flexibility values. For example, flexibility values for a region including the lungs may be greater than flexibility values for a spinal cord.

The set of flexibility values can be determined in various ways. In some embodiments, the set of flexibility values is experimentally determined. For example, the set of flexibility values is determined for each person and/or for each different organ by simulation. In another embodiment, the set of flexibility values is determined by matching a large population of images from multiple individuals to identify typical variations between and locations of organs. In some embodiments, boundaries between organs or other areas of interest in a body are configured to include specific areas of interest, such as specific organs or biological structures. These areas of interest may be associated with different flexibility values.

Other approaches to determining weighting between regions will be apparent to those of ordinary skill in the art, and may be included in alternative embodiments.

In various embodiments, a region to be operated on by External Force Computation Engine 210 and/or Internal Force Computation Engine 220 is determined by calculating an intermediate region based on a first region and a second region. The intermediate region may be based on an interpolation between the edges of a first region and the edges of a second sub region. For example, in one iteration of the deformation algorithm, the intermediate region may be bounded by a line (or surface) that is 26% of the distance from the first region to the second region. In a later iteration, the intermediate region may be bounded by a line (or surface) that is 28% of the distance from the first region to the second region. The percentage distance may change in manners similar to those discussed elsewhere herein with regard to the weighting factor w. Various intermediate regions may be calculated before or during the execution of iterations of the deformation algorithm. These pre-calculated intermediate regions may be stored in Repository 130.

In some embodiments, the transition between use of the first region and the use of the second region is more abrupt than in those examples discussed above. For example, the first region may be used by both phases of the deformation algorithm during initial iterations. After a triggering event, the first region may be used in one phase of the deformation algorithm and the second region may be used in the other phase. This approach is equivalent to changing the weighting factor w abruptly from one to zero. The triggering event may be a number of completed iterations, a quality of match achieved, a force magnitude, a user input, and/or the like.

The various examples of using a plurality of regions discussed herein may be used in combination. For example, in some embodiments the weighting factor w is kept at one for the first 50 iterations of the deformation algorithm and then change gradually from 0.5 to zero over the next 50 iterations.

Matching Engine 240 is configured for matching similar features in the reference image and the deformable image. Matching Engine 240 comprises logic configured for performing computations and/or data processing associated with the matching of similar features. For example, in some embodiments, Matching Engine 240 includes computing instructions embodied in a computer readable medium and configured to be executed using a processor of Computing System 110. In various embodiments, the matching comprises applying the external force and/or the internal force to the image transformation In some embodiments, Matching Engine 240 is configured for applying the external force prior to the internal force. In other embodiments, Matching Engine 240 is configured for applying the internal force prior to the external force.

The external force calculated using the External Force Computation Engine 210 and the internal force calculated using the Internal Force Computation Engine 220 have opposing effects on the deformation of an image. For example, while the external force tends to promote the movement of pixels so as to minimize the differences between the reference image and the deformable image, the internal force tends to limit the magnitude of displacement Vectors to avoid a disproportionate deformation that might otherwise cause the deformable image to dissolve. In some embodiments, Deformation Engine 120 is configured to deform an image (e.g., determine an image transformation) until an equilibrium is found between the internal force and the external force, on the basis of individual pixels, sets of pixels, region of an image, a specific-subregion, and/or all of an image. At equilibrium, the internal force and the external force are equal and the calculation of the image transform is complete. In some embodiments, Deformation Engine 120 is configured to deform an image through iterative application of the internal and external forces such that an equilibrium is approached. This process may conclude when a specific number of iterations has occurred, when the equilibrium is reached, and/or when further iterations result in inconsequential deformation. Equilibrium is described in further detail elsewhere herein, e.g., in connection with FIG. 5.

Figure 3:
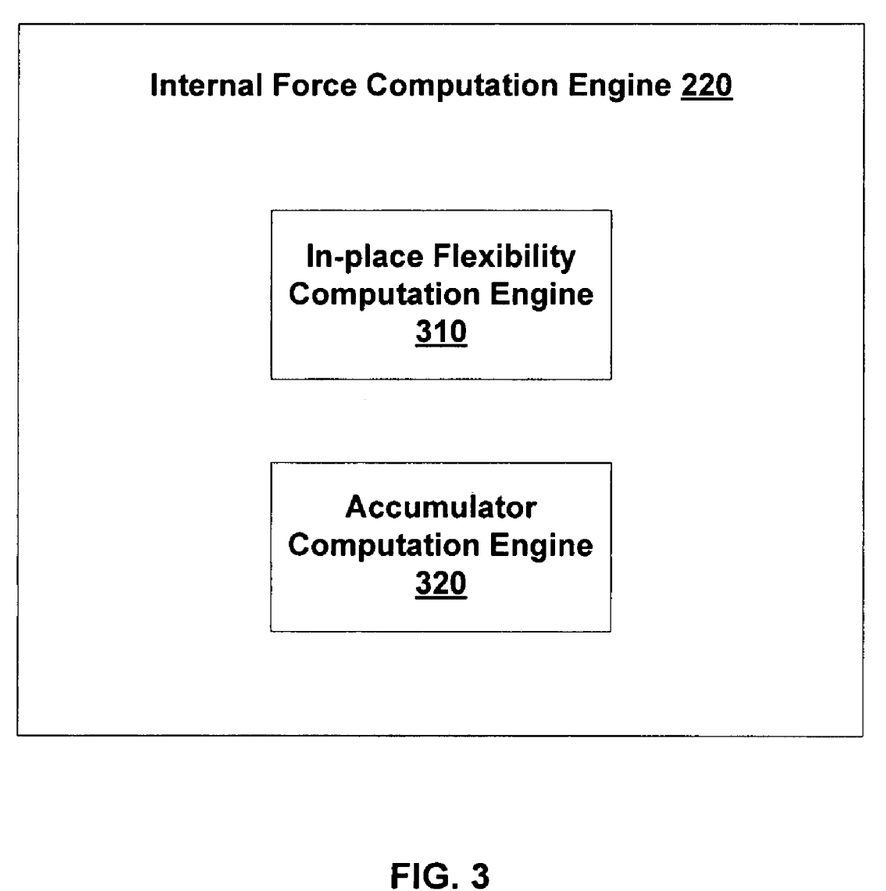
FIG. 3 illustrates various embodiments of a force computation engine configured to use more than one region to deform an image.

FIG. 3 illustrates various embodiments of Internal Force Computation Engine 220. Internal Force Computation Engine 220 optionally comprises In-Place Flexibility Computation Engine 310 and/or Accumulator Computation Engine 320. In-Place Flexibility Computation Engine 310 is configured to apply a flexibility model, e.g., internal force, without first calculating internal force vectors. For example, In-Place Flexibility Computation Engine 310 may be used as an alternative to Internal Force Computation Engine 220. In-Place Flexibility Computation Engine 310 makes changes to the image transformation directly, rather than by first calculating internal force vectors and then applying these vectors to the image transformation. The direct modification of the image transformation may be calculated in ways similar to those described herein with regard to calculating the internal force vectors.

Accumulator Computation Engine 320 is configured for computing the set of accumulators to be stored in Accumulators Memory 450, discussed elsewhere herein. The set of accumulators optionally allows for the deformation of the deformable image to decay in a smooth manner, for example, to avoid large deformations. The set of accumulators may be calculated using a specific region or a weighting between regions. This region or weighting thereof may change between iterations of the deformation algorithm and may be different from the region or weighting thereof used in calculating flexibility values. Different smoothing models may be applied to different regions. For example, an exponential smoothing model, in which the set of accumulators can be used to change the smoothing as a function of position and/or direction, may be applied to one region, while a Gaussian smoothing model is applied to a second region. In the exponential smoothing model, a set of accumulators allows for the exponential smoothing model to be performed incrementally pixel-by-pixel in one direction, causing exponential decay. The exponential decay is controlled by one or more exponential decay parameters within an exponential function of the exponential smoothing model. These parameters may be spatially and/or region dependent and are configured to determine the degree to which surrounding pixels are included in the smoothing as a function of their distance. Unlike a Gaussian smoothing model, the exponential smoothing model can include abrupt changes in the exponential decay as a function of position and/or direction. This facilitates the deformation of images near abrupt changes in an anatomical structure, for example, at the boundaries between organs. In some embodiments, smoothing is applied to all of an image while other steps in the deformation algorithm are applied to a smaller region of the image.

Figure 4:
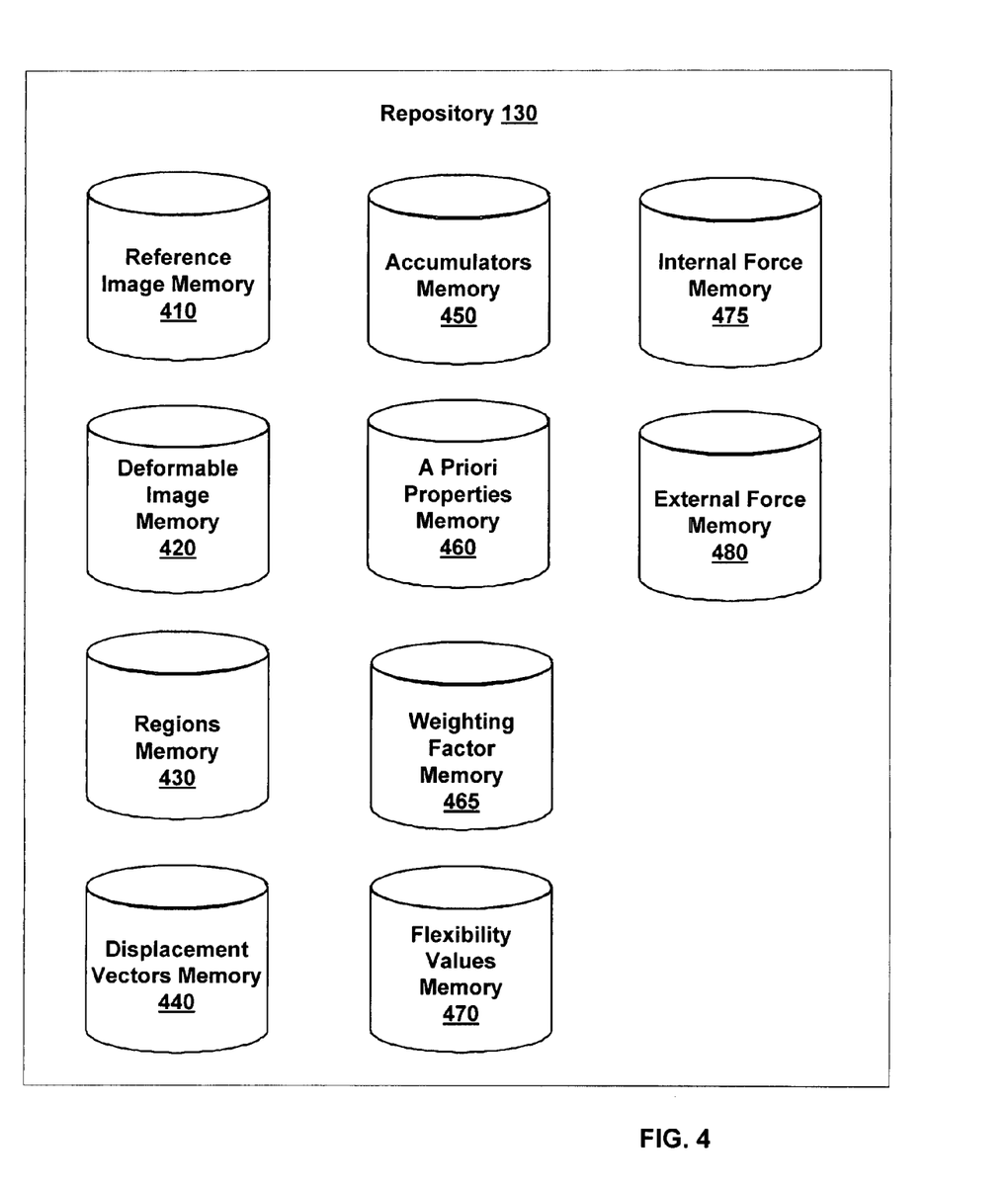
FIG. 4 illustrates various embodiment of a repository.

FIG. 4 illustrates various embodiments of Repository 130. Repository 130 includes data storage configured for storing data related to Image Registration System 100. Repository 130 comprises a Reference Image Memory 410, Deformable Image Memory 420, Regions Memory 430, Displacement Vectors Memory 440, Accumulators Memory 450, A Priori Properties Memory 460, Weight Factor Memory 465, Flexibility Values Memory 470, Internal Force Memory 475, and/or External Force Memory 480. These memories are configured for storing a reference image, a deformable image, region information, displacement vectors, accumulators, and a priori properties, respectively. In various embodiments, two or more of these memories share the same computer readable medium. For example, in various embodiments, Reference Image Memory 410 and Deformable Image Memory 420 may be combined or implemented on the same device.

Reference Image Memory 410 comprises a computer readable medium configured to store at least one reference image of a patient. For example, Reference Image Memory 410 may be configured to store a set of images of a brain of a single patient over the course of treatment. Deformable Image Memory 420 comprises a computer readable medium configured to store a deformable image, for example, a computerized brain atlas of a healthy individual, or a previously recorded image of a patient. A reference image stored in Reference Image Memory 410 is optionally generated using Image Generation Apparatus 140.

In some embodiments, the deformable image is configured to be deformed on a pixel-by-pixel basis to match the reference image such that structures of interest can be identified in the reference image. For example, within the deformable image, one or more pixels may be pre-associated with specific structures of interest. In the image registration process, these pre-associated pixels are matched to pixels in the reference image. It can then be assumed that these matched pixels in the reference image are associated with the same structures of interest as the pre-associated pixels. Structures of interest within the reference image are thereby identified. This identification can be automatic when performed under computer control, e.g., performed autonomously by a computing device without human intervention. In some embodiments, the identification of matching structures of interest is used to monitor a change in size, position, or other characteristic of a structure of interest in the same patient over time. In some embodiments, the pre-associated pixels comprise one of the regions of the images.

The deformable image stored in Deformable Image Memory 420 is optionally generated using Image Generation Apparatus 140. The deformable image may include an image of a patient, an image of a healthy person, or a synthetic anatomical image. In some embodiments, Reference Image Memory 410 and Deformable Image Memory 420 share the same device within Computing System 110. For example, Reference Image Memory 410 and Deformable Image Memory 420 may be included on the same hard drive.

Regions Memory 430 comprises a computer readable medium configured for storing data associated with regions of the images and/or weighting factors relating to these regions. For example, Regions memory 430 may be configured to store pre-computed intermediate regions or weighting factors for use in determining a relative weight between a plurality of regions.

Displacement Vectors Memory 440 comprises a computer readable medium configured for storing the displacement vectors computed by Internal Force Computation Engine 220. Displacement Vectors Memory 440 is typically configured to store one displacement vector for each pixel in the deformable image.

Optional Accumulators Memory 450 comprises a computer readable medium configured for storing sets of accumulators computed by Internal Force Computation Engine 220. An accumulator is a pixel-by-pixel accumulation factor associated with the smoothing model. The set of accumulators is used to modify the rate of decay of the smoothing model. For example, in embodiments comprising the exponential smoothing model, Accumulators Memory 450 is configured to store the set of accumulators for each pixel affecting the rate of decay. The role of accumulators is further described elsewhere herein, e.g., in connection with FIGS. 4 and 5.

The regions of an image discussed herein may include all of the image or a set of pixels representative of a volume or area within the image. In some embodiments, a region is specified by a physician or other operator using a graphical user interface. For example, a physician may specify a region by drawing an outline of a cortical surface on the image. In some embodiments, the drawing is made by hand, e.g., by a physician. In other embodiments, part or all of the drawing is made in an automatic fashion, for example, by an apparatus comprising computer code configured to outline the region. In some embodiments, a region is specified using the boundaries of a treatment volume. For example, the region may be equal to the treatment volume or a cross-section thereof. The region may be equal to the treatment volume plus a 5 or 10 millimeter boundary around the treatment volume. A region may include disjoint (e.g., unconnected) sets of pixels. For example, a region may include a group of bones separated from each other by intervening tissues. Each bone may be represented by a disjoint set of pixels.

A region may be a subset of another region. For example, a first region may include all or a substantial part of an image of a chest cavity while a second region may include part of a heart within the chest cavity. A region may include some pixels that are part of another region and some pixels that are not part of the other region. A region may entirely surround an area or volume that is not part of that region. For example, a first region may include a heart and a second region may include the heart excluding volumes occupied by heart valves.

In some embodiments, regions do not include discrete boundaries. For example, a region may include a boundary represented by a Gaussian or exponential distribution. Pixels within these distributions are weighted according to the respective distribution function. In some embodiments, regions are defined or bounded by a wavefunction.

A Priori Properties Memory 460 comprises a computer readable medium configured for storing a priori data for use in deformation of an image. A priori data can include data about deformation properties by anatomical structure (e.g., by organ) and/or by patient. For example, a priori data about the lung may include an expected volume of the lung, possible regions within the lung, areas or volumes of interest, and/or the like.

Optional Weight Factor Memory 465 is configured for storing weighting factors w calculated using Weighting Factor Computation Engine 236. The stored weighting factors w may include an array of weighting factors w associated with one or more specific regions or pixels of an image. For example, members of the stored weighting factors w may be mapped to different parts of a medical deformable image. Likewise, optional Flexibility Values Memory 470 is configured to store Flexibility Values calculated using Flexibility Value Computation Engine 233. Optional Internal Force Memory 475 is configured to store internal force vectors, and optional External Force Memory 480 is configured to store external force vectors, as may be calculated using Internal Force Computation Engine 220 and External Force Computation Engine 210, respectively. These various memories may be used to store values between iterations of a deformation algorithm.

Figure 5:
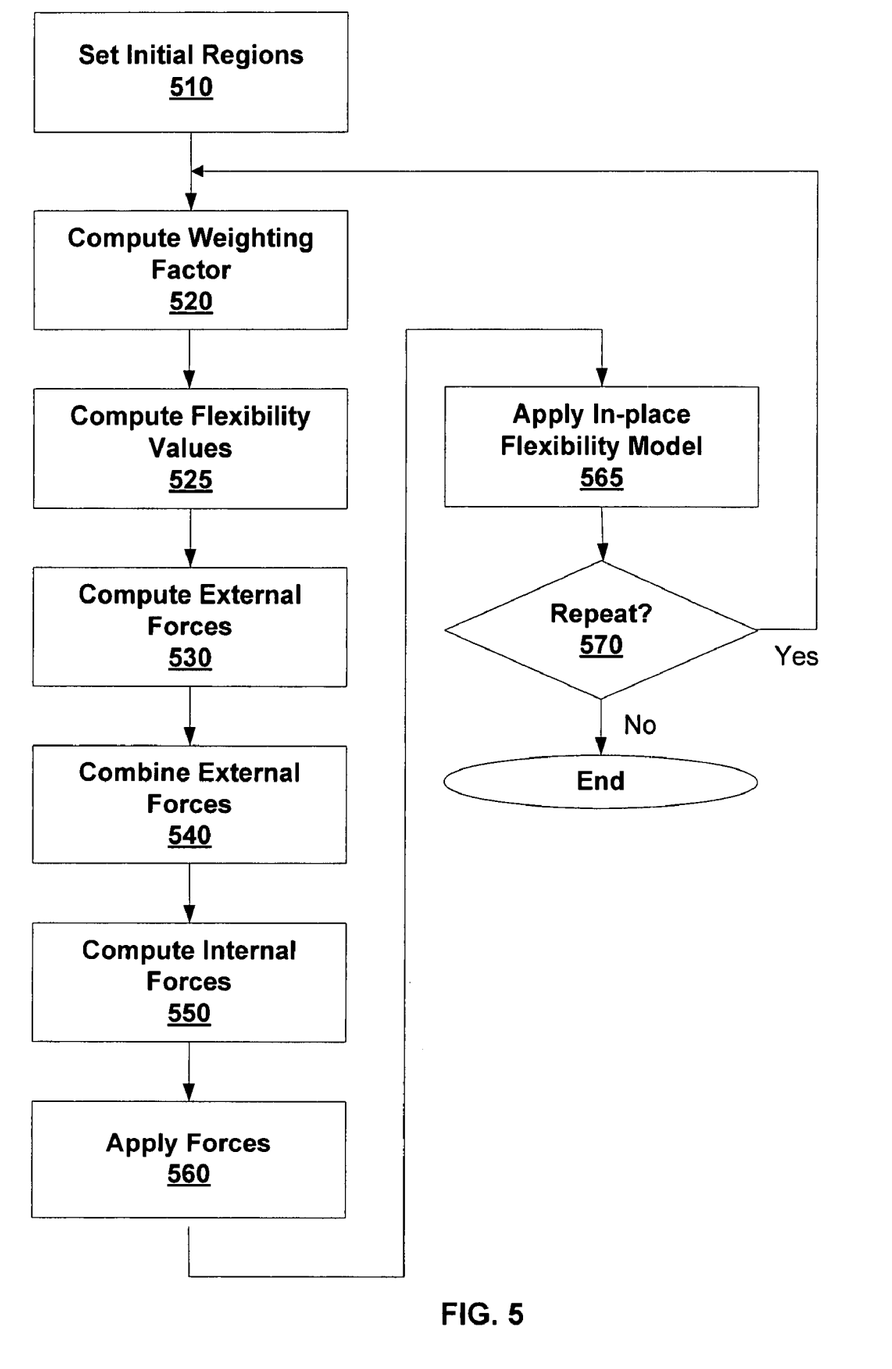
FIG. 5 illustrates methods of deforming an image, according to various embodiments.

FIG. 5 illustrates methods of deforming an image, according to various embodiments. Typically, these methods include the use of a plurality of different regions of an image. For example, in some embodiments intermediate regions are used in one or more steps of a deformation algorithm. In some embodiments, a weighting factor is used to weight the contribution of two different regions in a first phase of a deformation algorithm while a weighting factor is not used in a second phase of the deformation algorithm. While the examples illustrated by FIG. 5 include the use of a weighting factor, it will be apparent to one of ordinary skill in the art that similar examples may be applied to embodiments that make use of intermediate regions. Further, while the examples provided include the use of regions in application of the external force of a deformation algorithm, the use of regions may be applied to other parts of the deformation algorithm, e.g. all or part of the application of the internal force.

In an optional Set Initial Regions Step 510, initial regions are determined, for example, using a priori data on deformation properties stored in A Priori Properties Memory 460. The initial regions may be selected depending on anatomical structures (e.g., organs) of interest and/or on characteristics of an individual (e.g., patient). For example, a first region may be selected to include a set of anatomical structures (e.g., the lungs, heart, major arteries and veins, and surrounding chest cavity) and a second region may be selected to include one member of the set of anatomical structures (e.g., a major artery). In some embodiments, the first region includes all or a majority of an image and the second region includes primarily an area of greatest interest. This area of greatest interest sometimes includes a treatment volume. Typically, the first region is selected for greater consideration (i.e. weighting) in early iterations of the image deformation process during which the images are coarsely aligned. The second region is then selected for greater consideration in final stages of the image deformation process in which more precise alignment is achieved. For example, the first region may include the pelvic bones, which can be used to roughly align the deformable and reference images, and the second region may include the bladder within which a treatment volume is located.

In some embodiments, identities of the first and second regions are input to Image Registration System 100 via an interface of Computing System 110. For example, a user may designate the first and second regions by delineating the boundaries of these regions on an image displayed to a user. In some embodiments, the first region includes all of an image and the second region includes a treatment volume by default.

In an optional Compute Weighting Factor Step 520, a weighting factor w is determined using Region Determination Engine 230. As is discussed elsewhere herein, this determination may be made using a linear or non-linear function, and may be responsive to a number of iterations of the deformation algorithm performed, a quality of match, force values, and/or the like. As illustrated in FIG. 5, Compute Weighting Factor Step 520 may be repeated in different iterations of the deformation algorithm.

In an optional Compute Flexibility Values Step 525, flexibility values are calculated using the first and/or second regions. These flexibility values are calculated using Flexibility Value Computation Engine 233 and are stored in Flexibility Values Memory 470. In various embodiments, the calculated flexibility values can be defined on a per pixel basis, for a specific region, or globally. Further details of the calculated flexibility values are described elsewhere herein. For example, the accumulator values discussed elsewhere herein may be one example of these flexibility values.

In a Compute External Forces Step 530, external forces are calculated for both the first and second regions using the External Force Computation Engine 210. The calculations performed for each of the regions may be performed in parallel or serially. In some embodiments, Compute External Forces Step 530 results in two sets of forces associated with the first and second regions respectively. For example, a first set of forces may be associated with the pixels included in the first region and a second set of forces may be associated with the pixels included in the second region. Pixels included in both the first and second regions may be associated with more than one force value.

In a Combine External Forces Step 540, the two sets of forces calculated in Compute External forces Step 530 are combined using the External Force Computation Engine 210 and the weighting factor w computed in Compute Weighting Factor Step 520. For example, for each pixel associated with more than one force value, $F_1$ and $F_2$, a combined force value $F_c$ may be calculated using the equation $F_c = wF_1 + (1-w)F_2$. Those pixels associated with one force value are assigned that force value.

In alternative embodiments, Compute External Forces Step 530 and Combine External Forces Step 540 are combined into a single step. In these embodiments, a single set of external forces is calculated using External Force Computation Engine 210, pixels within the two images and the weighting factor w. By including the weighting factor w in the calculation of external forces from image pixels, a later combination of forces is not required.

In a Compute Internal Forces Step 550, Internal Force Computation Engine 220 is used to compute a set of internal forces. Typically, these forces are computed on a pixel by pixel basis. This computation may include computation of a flexibility model, application of the computed flexibility model to the deformable image to generate a set of displacement vectors, computation of a smoothing function, and application of the smoothing function to the set of displacement factors. In some embodiments, these computations are based on an intermediate region or a weighting between the first and second regions. In various embodiments, one or more of these computations is based on only one of the first and second regions. For example, in some embodiments Compute Internal Forces Step 550 is performed using only the first region. As such, Compute Internal Forces Step 550 is performed on all or a substantial part of the deformable image. In various embodiments, the substantial part of the deformable image includes at least 50, 60, 70, 80 or 90% of the deformable image.

The internal force is characterized by a strength as well as a direction (e.g., push for expansion or pull for contraction). Collectively, the internal force vectors represent the internal force field between the deformable image and the reference image. A displacement value is the strength, e.g., magnitude, of a displacement vector. Typically, the displacement value is represented mathematically as $f(i)$, $0 \leq i < s$, where i is an integer and s equals the size of the grid of pixels.

The computation of the flexibility model in Compute Internal Forces Step 550 further comprises computing the set of flexibility values. The computation of flexibility values is performed by Flexibility Value Computation Engine 233 and may be based on one or more region. The set of flexibility values represents the flexibility of a binding between neighboring pixels of the flexibility model. The set of flexibility values is optionally spatially variant, i.e., may depend on position and/or direction. In some embodiments, different flexibility values are used in different regions. For example, a first set of flexibility values may be used for pixels included in the first region The flexibility value is optionally represented mathematically as u. A complexity of the flexibility model can be increased starting with its simplest form, in which u is a constant value. Next, u can be made spatially variant with respect to the position of the pixel value i. Thus, u=u(i), in one dimension.

The flexibility value u can be extended to become multi-dimensional. There are several ways to extend u to multiple dimensions. In one extension, the coordinates are assumed to be separate. For example, for a three-dimensional model, the coordinates can be separated into an x, y and z-axis. A two-way convolution is applied along each of the coordinate axes separately. This convolution is not circularly symmetric. However, in practice, this asymmetry does not substantially affect results. In a further approach, the flexibility model is extended to multiple dimensions by performing a convolution operation along multiple discrete axes and thereafter summing the results. The multi-dimensional model can be made bi-directional in one or more dimensions. The flexibility model can further be made spatially variant with respect to the direction of stretching.

Compute Internal Forces Step 550 optionally further includes computation of a set of accumulators using Accumulator Computation Engine 420. The calculated set of accumulators is typically stored in Accumulators Memory 450. In some embodiments, the accumulator is represented mathematically as $a_i$, where $a_i = a_{i-1}(1-\exp(-u)) + f(i)$. The derivative becomes $f'(i) = a_i \exp(-u)$. The initial value is typically set to zero, i.e., $a_0 = 0$. The foregoing mathematical formulas can be shown to be equivalent to a discrete convolution of f(i) with exp(−ui), where exp(−ui) is an exponential kernel. An advantage of the exponential kernel representation is that only the previous accumulator $a_{i-1}$ needs to be stored during the convolution operation. In some embodiments, the mathematical representation of the set of accumulators includes the k×k matrix M.

The smoothing model used in Compute Internal Force Step 550 can comprise the Gaussian model typically used in the demons algorithm, the exponential kernel model as described in connection with Compute Accumulators for Internal Force Step 540, or the like. In some embodiments that include the Gaussian smoothing model, the same Gaussian function is used in each iteration of the method (e.g., the value of the standard deviation remains constant between iterations of computations of the Gaussian smoothing function). In some embodiments, a different Gaussian smoothing model is used in different iterations. For example, the value of the standard deviation may vary between iterations.

In some embodiments, the deformation algorithm comprises a constant scalar smoothing model. In these embodiments, Compute Accumulators for Internal Force Step 540 is optional.

In an Apply Forces Step 560, similar features (e.g., anatomical structures) in the reference image and the deformable image are matched by applying the external force and the internal force to the image transformation, subject to the external constraints computed using External Force Computation Engine 210. The computations are typically performed by software and/or firmware. In some embodiments, the software and/or firmware is stored in Deformation Engine 120. In other embodiments, part or all of the software and/or firmware is stored in Computing System 110.

In some embodiments, an Apply In-place Flexibility Model Step 565 may be performed instead of or in addition to Compute Internal Forces Step 550. In contrast to Compute Internal Forces Step 550, which is used to calculate an array of internal force vectors that are then applied to the image transformation, in Apply Forces Step 560, Apply In-place Flexibility Model Step 565, applies a force by directly modifying the image transformation. The force can be, for example, a smoothing force.

In a Repeat Step 570, a determination is made as to whether to repeat the method and, if so, the process returns to Compute Weighting Factor Step 520. Each repetition represents an iteration of the deformation algorithm. In some embodiments, the method is repeated until equilibrium is reached between the internal and external force. At equilibrium, subsequent iterations do not significantly improve the image match. For example, in some embodiments, a determination can be made not to repeat the method when Apply forces Step 560 results in transformation vector changes with lengths below determined values. In other embodiments, a determination is made not to repeat the method after a predetermined number of iterations has been completed.

If, in Repeat Step 570, a determination is made not to repeat the method and, therefore, not repeat the process starting with Compute Weighting Factor Step 520, the user of Image Registration System 100 (e.g., a treating physician) can quantify the anatomical structure (e.g., compute a volume of gray matter and/or white matter of the brain). Such quantization has various pathological uses, including determining future treatment options. The reference image taken for planning purposes at the outset of the treatment may then be compared with the deformable image at equilibrium to identify movement and/or changes in the patient over time. Following the deformation process illustrated by FIG. 5, the deformed deformable image may be used to accurately identify the location of a treatment volume or sensitive organs in order to avoid injuring the patient with, for example, radiation beams in the spinal cord.

Several embodiments are specifically illustrated and/or described herein. However, it will be appreciated that modifications and variations are covered by the above teachings and within the scope of the appended claims without departing from the spirit and intended scope thereof. For example, the systems and methods described herein are equally applicable to image registration in applications other than the medical field. Thus, as used herein, terms such as anatomical structure may be read to include structures other than human biological organs. In various embodiments, some or all of the logic disclosed herein is stored in the form of computing instructions on a computer readable medium. In some embodiments, Deformation Engine 120 and/or Repository 130 are comprised within Computing System 110. In some embodiments, part or all of one or more steps illustrated by FIG. 5 may be computed by a logic component of Deformation Engine 120 other than the logic component illustrated in FIGS. 2, 3, and 4. For example, in some embodiments, the internal and external forces may be computed using the same logic. Logic components described herein may include hardware, firmware or software embodied on a computer readable medium. While the examples discussed herein are presented in the context of a pixel-based image system, it will be apparent to one of ordinary skill in the art that some embodiments are readily adapted to model-based image systems such as those described in www.sci.utah.edu/research/warping.html. The systems and methods discussed herein may be applied to two or three-dimensional images.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An image registration system comprising:
   a deformation engine comprising:
   first logic configured to compute a flexibility model using a first region within a medical deformable image and to apply the computed flexibility model to the medical deformable image to generate a set of displacement vectors, the set of displacement vectors being configured to apply a first force to the medical deformable image;
   second logic configured to compute a smoothing function using the first region within the medical deformable image and to apply the smoothing function to the set of displacement vectors to create a smoothed set of displacement vectors;
   third logic configured to compute a transform using a second region of the medical deformable image, the transform being configured to apply a second force to the medical deformable image, the second force opposing the first force; and
   fourth logic configured to apply the smoothed set of displacement vectors and the transform to the medical deformable image in one of a plurality of iterations to deform the medical deformable image to match a reference image.

2. The image registration system of claim 1, wherein the second region of the medical deformable image is changed between different iterations of the iterative process.

3. The image registration system of claim 1, wherein the first region includes greater than fifty percent of the medical deformable image.

4. The image registration system of claim 1, wherein the second region is a subset of the first region.

5. The image registration system of claim 1, wherein a boundary of the second region is approximated using a distribution function.

6. The image registration system of claim 1, wherein the third logic is configured to use a weighted combination of the first region and the second region to compute the transform.

7. The image registration system of claim 6, wherein the third logic is configured to use different weighted combinations of the first region and the second region to compute the transform in different members of the plurality of iterations.

8. The image registration system of claim 1, wherein the third logic is configured to use the second region to compute the transform in one member of the plurality of iterations and configured to use the first region to compute the transform in a second member of the plurality of iterations.

9. The image registration system of claim 1, further comprising an image generation apparatus configured to produce the medical deformable image.

10. An image registration system comprising:
    a deformation engine comprising:
    first logic configured to compute a flexibility model using a medical deformable image, and to apply the computed flexibility model to the medical deformable image to generate sets of displacement vectors, the sets of displacement vectors being configured to apply a first force to the medical deformable image;
    second logic configured to compute smoothing functions using a first region of the medical deformable image and to apply the computed smoothing function to the sets of displacement vectors to create a smoothed set of displacement vectors;
    third logic configured to compute transforms using a first region and a second region of the medical deformable image, the transform being configured to apply a second force to the medical deformable image, the second force opposing the first force; and
    fourth logic configured to apply the smoothed sets of displacement vectors and the transforms to the medical deformable image in an iterative process to deform the medical deformable image to match a reference image, at least one iteration of the iterative process including use of the first region to compute one of the smoothing functions and use of the second region to compute one of the transforms.

11. The image registration system of claim 10, wherein the second region is a subset of the first region.

12. The image registration system of claim 10, wherein the third logic is configured to use a weighting factor to calculate contributions from the first region and the second region.

13. The image registration system of claim 12, wherein the weighting factor is changed during the iterative process.

14. A method comprising:
    computing a set of displacement vectors according to a flexibility model using a first region of a medical deformable image, the set of displacement vectors being configured to apply a first force to the medical deformable image;
    applying a smoothing function to the set of displacement vectors to create a smoothed set of displacement vectors;
    computing a transform using a second region of the medical deformable image, the transform being configured to apply a second force to the medical deformable image, the second force opposing the first force and being different from the first region; and
    applying the transform and the smoothed set of displacement vectors to the medical deformable image in an iteration of a deformation algorithm configured to match the medical deformable image to a reference image.

15. The method of claim 14, wherein computing the transform includes using both the first region and the second region, and further comprising calculating a weighting factor configured to weight the relative contributions of the first region and the second region to the transform.

16. The method of claim 15, further comprising changing the weighting factor between iterations of computing the transform.

17. The method of claim 14, wherein computing the transform includes determining an intermediate region using the first region and the second region.

18. The method of claim 14, wherein computing the transform includes calculating a first transform using the first region, computing a second transform using the second region, and using a weighting factor to combine the first transform and the second transform.

19. The method of claim 14, wherein the first region includes at least 50% of the medical deformable image.

20. The method of claim 19, wherein some pixels within the medical deformable image are included in both the first region and the second region.

21. An image deformation engine comprising:

first logic configured to compute a plurality of weights associated with a first region within a medical deformable image, and to use the plurality of weights to determine a first set of force vectors, the first set of force vectors being configured to apply a first force to an image transformation between the medical deformable image and a reference image;

second logic configured to compute a flexibility model using a second region within the medical deformable image and to apply the flexibility model to generate a second set of force vectors, the second set of force vector being configured to apply a second force to the image transformation, the second force opposing the first force; and third logic configured to apply the first set of force vectors and the second sets of force vectors to the image transformation in one of a plurality of iterations to match the medical deformable image and the reference image.

22. The image deformation engine of claim 21, wherein members of the plurality of weights are mapped to different parts of the medical deformable image.

23. The image deformation engine of claim 21, wherein the plurality of weights change between members of the plurality of iterations.

24. An image deformation engine comprising:

first logic configured to compute a plurality of weights associated with a first region within a medical deformable image and to use the plurality of weights to determine a first set of force vectors, the first set of force vectors being configured to apply a force to an image transformation between the medical deformable image and a reference image;

second logic configured to compute a flexibility model using a second region within the medical deformable image and to apply the flexibility model to the image transformation; and third logic configured to use the first logic and the second logic in one of a plurality of iterations to generate the image transformation.

25. The image deformation engine of claim 24, wherein members of the plurality of weights are mapped to different parts of the medical deformable image.

26. The image deformation engine of claim 24, wherein the second logic is configured to compute the flexibility model using an in-place flexibility computation engine.

27. The image deformation engine of claim 24, wherein the first region or the second region changes between members of the plurality of iterations.

* * * * *